US007962844B2

(12) United States Patent
Knotz et al.

(10) Patent No.: US 7,962,844 B2
(45) Date of Patent: Jun. 14, 2011

(54) DYNAMIC PUBLICATION OF INFORMATION FROM A DATABASE

(75) Inventors: Christopher J. Knotz, Seattle, WA (US); Thomas R. Landon, Redmond, WA (US); Dan Everhart, Seattle, WA (US); Scott Lachance, Kingston, WA (US); Robert Dunn-Ballinger, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 894 days.

(21) Appl. No.: 11/852,872

(22) Filed: Sep. 10, 2007

(65) Prior Publication Data

US 2007/0299853 A1    Dec. 27, 2007

Related U.S. Application Data

(63) Continuation of application No. 09/696,627, filed on Oct. 25, 2000, now Pat. No. 7,287,218.

(51) Int. Cl.
*G06F 17/00* (2006.01)
(52) U.S. Cl. .................. 715/209; 715/229; 715/234
(58) Field of Classification Search .................. 715/522, 715/517, 513
See application file for complete search history.

(56) References Cited

U.S. PATENT DOCUMENTS

| | | | | |
|---|---|---|---|---|
| 5,727,156 A * | 3/1998 | Herr-Hoyman et al. | ....... | 709/219 |
| 5,860,073 A * | 1/1999 | Ferrel et al. | ..... | 715/255 |
| 5,870,712 A * | 2/1999 | Kiuchi et al. | ..... | 705/8 |
| 6,014,137 A * | 1/2000 | Burns | ......... | 715/747 |
| 6,088,702 A * | 7/2000 | Plantz et al. | ......... | 1/1 |
| 6,195,091 B1 * | 2/2001 | Harple et al. | ......... | 715/751 |
| 6,233,578 B1 * | 5/2001 | Machihara et al. | ......... | 1/1 |
| 6,327,628 B1 * | 12/2001 | Anuff et al. | ......... | 719/311 |
| 6,581,094 B1 * | 6/2003 | Gao | ......... | 709/220 |
| 6,594,466 B1 * | 7/2003 | Harned et al. | ......... | 434/350 |
| 6,748,418 B1 * | 6/2004 | Yoshida et al. | ......... | 709/204 |
| 6,768,558 B1 * | 7/2004 | Yamashita et al. | ......... | 358/1.18 |
| 6,847,800 B2 * | 1/2005 | Harned et al. | ......... | 434/350 |
| 7,065,493 B1 * | 6/2006 | Homsi | ......... | 705/8 |

* cited by examiner

*Primary Examiner* — Doug Hutton
*Assistant Examiner* — Nathan Hillery
(74) *Attorney, Agent, or Firm* — Kilpatrick Townsend & Stockton LLP

(57) ABSTRACT

Systems and methods for electronic management can be configured so that content is stored apart from the information for formatting the content. A data structure for the content may be initially defined, and content items may be stored in the data structure. Formatting information may be stored separately from the content in the form of a template. To publish formatted content, the stored content may be merged with the template. Specialized tags may be included in the template to permit added publishing functionality. In this manner, the system can easily manage large volumes of content and deliver the content to a variety of specialized target devices.

25 Claims, 12 Drawing Sheets

DYNAMIC PUBLICATION OF INFORMATION FROM A DATABASE

RELATED APPLICATIONS

This application is a continuation of U.S. patent application Ser. No. 09/696,627, filed Oct. 25, 2000, now U.S. Pat. No. 7,287,218, issued Oct. 23, 2007, which is hereby incorporated by reference.

TECHNICAL FIELD

This invention relates to electronic content management systems.

BACKGROUND

The explosive growth in the amount of information that is generated each day has brought with it a great need to manage that information. In particular, content stored in electronic form or content intended to be delivered electronically, whether in the form of news reports, corporate information, stock quotations, academic publications, or entertainment, needs to be managed so that it can be found easily and delivered to a consumer in a format that is comprehensible to that consumer. The Internet has made it easier to produce content by making an audience available to people who normally would not have published their work widely, by making content available as a starting point for the generation of additional content, and by making information (such as stock quotes, news, and weather) easily available to automatic content generators and aggregators.

The Internet has also made it easier for a consumer to acquire content, particularly through the Internet by using a now-ubiquitous web browser. The amount of content available to a single consumer over the Internet is many times what the consumer could access at a library or a bookstore. In addition, the content comes in many forms, whether written, graphical, or multimedia. Various searching tools also help the consumer find desired content.

Although many tools exist to create and review information, the ability to manage large amounts of information in a manner that permits someone to access and publish the information effectively and flexibly is limited.

SUMMARY

The present invention is directed toward a system and method for organizing and publishing content using a computer network such as the Internet. The system and method can be configured to deliver a relatively large body of information in a variety of formats, yet be usable by relatively unsophisticated people or by an automated publishing tool.

The content can be stored, for example, in a database, and the formatting information for the content can be stored in the same or another database. The content may be stored separately from the formatting information so that the content is easier to search, edit, and manage, so that a single set of formatting information may be applied to multiple groups of content, and so that a single set of content information may have multiple sets of formatting information applied to it. The database for the content may be generated automatically in response to requests from a user or from another computer system. When the content is to be published, it can be merged with the formatting information by a publication engine, and made available for consumers of the information.

In one example, the system comprises a content definition editor, a data structure generator, a content item editor, a template editor, and a publisher. The content definition editor receives parameters for defining the content and provides the parameters to the data structure generator, which produces a data structure in a database that relates to the parameters. The parameters may comprise one or more data types, such as text, numerical, or filename. The content item editor receives one or more content items that correspond to a particular data structure, and provides the items to the database so that the items can be published. The template editor permits the creation and alteration of templates which control the manner in which the content items are published. Finally, the publisher combines particular content items with a template so that the content items are published in a formatted manner, for example, as Web pages.

The data structure may be generated automatically by the content management system in response to information provided by a user on a simple form, such as a blank tabbed form. In addition, the content definitions, the content items, and the templates may be stored together in the same database, such as a relational database, or may be stored in a separate database, including databases connected by a communications channel such as the Internet. Furthermore, the content definition editor, the data structure generator, the content item editor, the template editor, and the publisher may all be located at a single computing site, or they may each be located at various sites, including sites connected by wired or wireless communications links. For example, the content item editor could be located away from the site where the databases reside and could be accessed by a remote Internet kiosk.

In another example, a method for publishing content is described. The method may include the steps of providing content definition information to a content definition editor, producing a content data structure based on that information, providing to the data structure content item information that corresponds to the data structure, generating and storing formatting information separately from the content item information, and publishing the content item information in a formatted manner using the formatting information.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
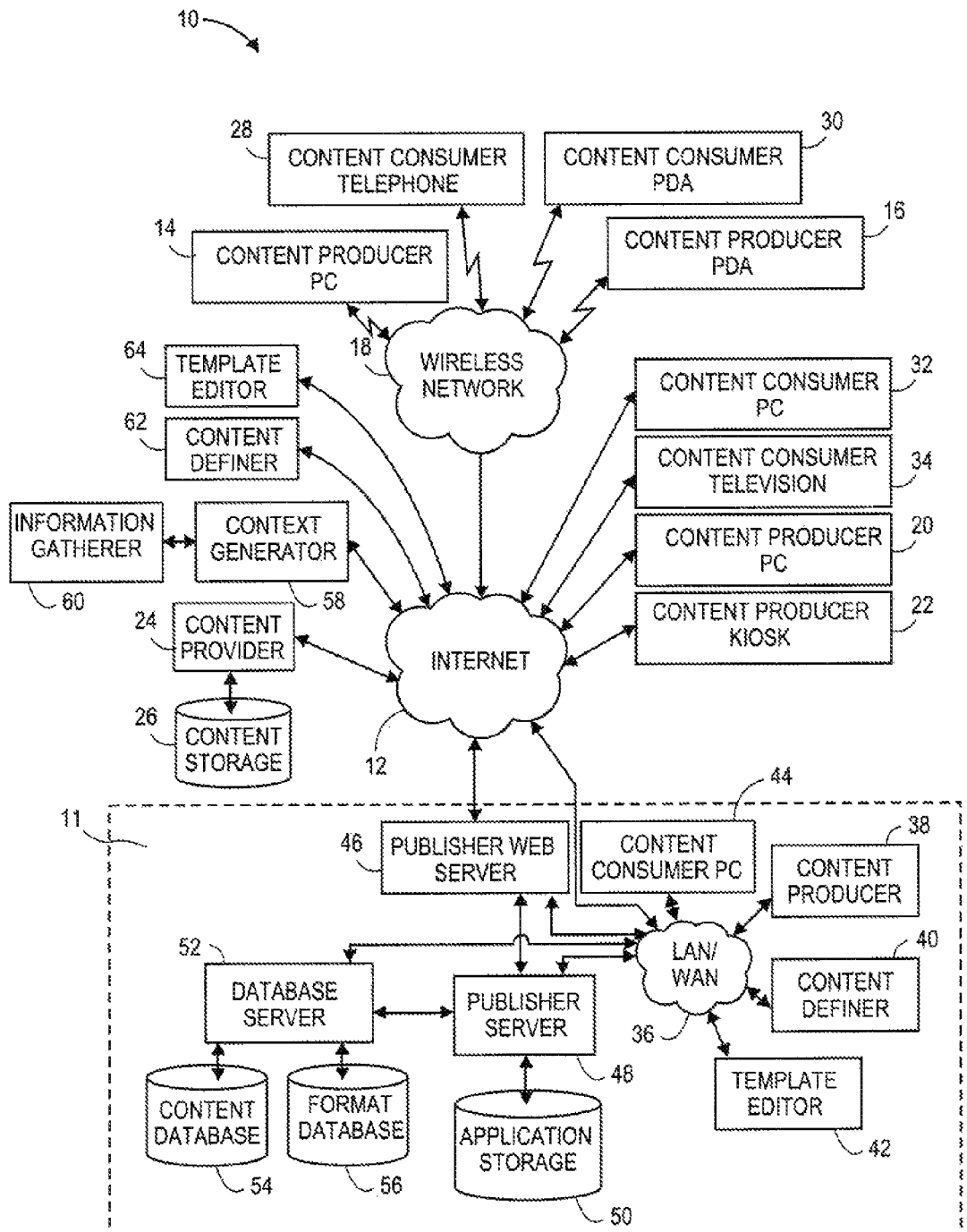
FIG. 1 is a block diagram illustrating a system for creating, managing, and publishing information via a global computer network.

FIG. 1 is a block diagram illustrating a system for creating, managing, and publishing information via a global computer network, such as the Internet 12. Content management system 10 can be used to practice methods for accepting information from various information sources, such as individual content producers 14, 16, 20, 22, 38, content providers 24, or content generators 58. System 10 may store the information in a content database 54 or databases, and may also store formatting information for the content in a format database 56 or databases. System 10 may, when the information is requested, combine the content with the formatting information and publish the formatted content.

With further reference to FIG. 1, system 10 also may include a publisher web server 46 that connects to the Internet 12. Publisher web server 46 may also connect to a LAN/WAN 36. A publisher server 48 may connect to the publisher web server 46 and the LAN/WAN 36 to provide formatted content for access via Internet 12 or LAN/WAN 36. The publisher server 48 may include application programs stored in application storage 50 that permit publisher server 48 to present content in a formatted matter. Publisher server 48 may receive the content and the formatting information from database server 52. Database server 52 in turn may receive the content and formatting information to be provided to publisher server 48 from content database 54 and format database 56.

Content may be provided to content management system 10 in a variety of ways. For example, content may be produced by individuals connected to content management system 10 through the Internet 12 by way of a wireless network 18. As examples, content producer 14 is a personal computer connected to wireless network 18, and content producer 16 is a wireless personal digital assistant (PDA) connected to wireless network 18. Content may be produced on the respective devices by content producers 14, 16, and may be submitted to the content management system 10 through wireless network 18 and Internet 12. The content may be received by publisher web server 46 and provided to database server 52 for storage in content database 54. In a like manner, content producer 20 may provide content to system 10 through the Internet 12. In addition, content producer 22 may produce content and provide it to system 10 through the Internet by way of a kiosk, for example at an airport or other public facility.

Content may also be provided from within local site 11. As such, content producer 38 may supply content to content database 54 through LAN/WAN 36 and database server 52. Local site 11 could comprise the computers and computer network owned by a particular company, the computer system of an application service provider (ASP), the computer system at a particular physical location, or a number of scattered computers that are programmed to operate in cooperation to store, organize, and publish content.

Content may be produced in a number of ways. For example, a newspaper reporter working on a story in the field could produce a draft of the story on a wireless personal digital assistant (PDA) 16. When the draft is complete, the reporter could submit it through wireless network 18 and Internet 12 to local site 11. The text for the story could then be passed through publisher web server 46 to database server 52, and stored in content database 54. The story would then be available to content management system 10 for later editing or publication. In this manner, the user is capable of entering content into the system without needing to know how to format the content and without needing to know programming techniques.

Content may also be produced without direct human intervention. For example, content generator 54 may connect to information gatherer 60 to produce content. Information gatherer 60 could be a scientific instrument, such as a thermometer, and content generator 58 could be a personal computer that converts readings of the thermometer into a form that may be provided to local site 11 by way of Internet 12. Content generator 58 could also be any of a number of other means for generating content, such as stock price or video feeds, graphic generators, or scientific computation machines. Content that has been produced or generated previously may be provided by content provider 24, which obtains its content from content storage 26. In one example, content provider 24 could be an aggregator of content, such as a news wire or a service that provides stock price data from a number of sources. Content provider 24 could also be any other of a number of content sources.

Content may also be published in a number of ways. For example, content could be published over LAN/WAN 36 to a content consumer 44 using a personal computer at local site 11. Content could also be published to a content consumer 32 using a personal computer connected to the Internet 12. In addition, content could be published over wireless network 18 to consumers of the content such as content consumer 30 using a PDA or content consumer 28 using a telephone. Through any of these methods, the content may be viewed electronically or may be converted to hard copy for later review.

The content may be stored in a defined structure and may be published in a defined format. Content definer 62 may connect to local site 11 through the Internet 12, and may provide information that controls the manner in which the content is organized and stored. Content definer 62 may also connect to local site 11 in any other way that gives content definer 62 the ability to provide definition for the content. For example, content definer 40 could connect directly to LAN/WAN 36. Similarly, template editor 64 may connect to local site 11 through the Internet 12 to provide information regarding the format in which particular content is to be published. Any of the content producers and consumers, definers, or editors can be combined in a single unit or can communicate with system 10 in any of a number of well-known ways.

In operation, content management system 10 may manage and publish content through several steps. Content definer 62 may provide information to local site 11 regarding the manner in which certain content is to be organized and stored. For example, content definer 62 could establish a database schema that includes several text fields and a related graphics file. Template editor 64 may provide formatting information that controls how the content is displayed when it is published. For example, template editor 64 could create a publishing format whereby the graphics file that was defined by content definer 62 is published in the center of the text fields that were defined by content definer 62. Once the format of the content has been defined, the content may be entered and stored by system 10. For example, a content producer could access content management system 10, enter text into a number of text fields, and attach a graphics file to be associated with the text. The content may then be published according to the formatting information provided by the template editor 42 by combining the content with the formatting information. For example, System 10 may generate a web page that includes the content entered by the content producer, and display that content in a format corresponding to the information entered by the template editor 42.

Local site 11 may be organized in multiple ways. In FIG. 1, local site 11 is shown as residing within a single corporate computer network system. Employees of the corporation may communicate with each other by way of LAN/WAN 36 and may communicate with others through the Internet 12. Thus, system 10 could operate over a corporate Intranet site. Publisher web server 46 may communicate with the Internet 12 and LAN/WAN 36, and publisher server 48 may communicate with publisher web server 46 and LAN/WAN 36. In this manner, the content management system 10 may have access to content provided both by content producers at local site 11 and content producers on the Internet 12. The content management system 10 may also publish content to local users through LAN/WAN 36 and to users of the Internet 12 or wireless network 18 through publisher web server 46. Both content information and format information may be accessed through database server 52. However, databases containing either the content information or the format information could also be located elsewhere, including at other computer sites that are accessed through the Internet 12. Local site 11 may also be configured as an Application Service Provider (ASP), which provides publishing services for data stored either at local site 11 or elsewhere, and accessed through the Internet 12. Likewise, content may be distributed at many locations and may be formatted at a location that is different than the location at which the formatting information is stored.

The use of the term "system," particularly when discussing the content management system, is not intended to have a limiting effect and is not intended to be defined strictly as covering only a single type of system. Rather, although the content management system is described above as including all of the components in FIG. 1, it is not necessary that the system be that extensive, or that the system be tightly integrated. Rather, a system can comprise any of a number of components that cooperate to obtain a desired result. As a result, the embodiment of a system shown in FIG. 1 could consist only of the components at local site 1, or could also include one or more other components. In addition, although the embodiment shown and described operates through the Internet and by use of the World Wide Web, the invention is not limited to Web-based publishing and could involve any of a number of electronic communications media. In summary, the breadth of a particular system will depend on the context.

Figure 2:
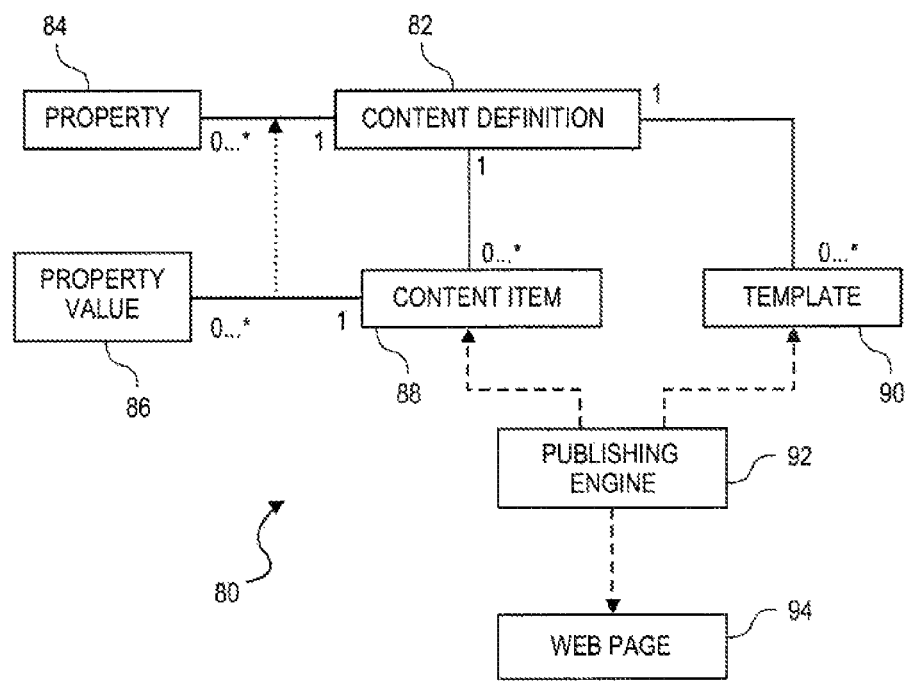
FIG. 2 is a conceptual diagram of the organization of a system for creating, managing, and publishing information via a global computer network.

FIG. 2 is a conceptual diagram, in Unified Modeling Language (UML), of the organization of a system 80 for creating, managing, and publishing information on a global computer network. In this system 80, the content on which the publishing system operates is treated separately from the formatting information, which controls how the content is displayed to a consumer. Advantageously, the content can be stored in simplified format that requires less storage space, and can be searched and edited easily. In addition, the more simplified the format of the content, the easier it is to share content from one system to another. Thus, the system may more easily aggregate content from multiple sources. Furthermore, the content requires fewer computing and storage resources when it is in a simplified form, and it can be combined with different types of formatting information.

The structure for the content is established by a content definition 82. The content definition 82 prescribes the manner in which a class of content will be stored and handled by the content management system. A particular content definition 82 may have a number of properties 84. For example, a content definition 82 that is intended to apply to corporate press releases could include properties 84 for the title of the release, the date of the release, the text of the release, and contact information for a company spokesperson. Alternatively, a content definition 82 related to a traffic and weather information web site could include properties 84 that connect to weather instruments or a weather information service, and to photo or video feeds from traffic cameras. Each property 84 will generally have one of a number of property types. For instance, the text of a press release could have a text property type, whereas a graphic accompanying a press release could have a file property type that would indicate to the content management system that it should create a link to a particular file on the system.

Each content definition 82 generally controls the structure of a particular class of content. Thus, a separate content definition 82 may be produced for each class of content in a document management system. Although each content definition 82 may be independent of other content definitions in a system, one content definition 82 could depend on another content definition. In this manner, changes in one content definition 82 could be replicated automatically in another content definition 82, permitting easier updating and management of the structure of the content management system.

Once a content definition 82 has been created, it may be instantiated with one or more content items 88. A content item 88 contains information that is stored and organized according to the structure provided by content definition 82, using property values 86. Each property value 86 in a content item 88 may correspond to a property in a content definition. Thus, for each property 84 in a content definition 82, a content item 88 could contain a corresponding number of property values 86. For example, a content item 88 could correspond to a particular press release from a company. If the press release content definition 82 includes properties 84 for press release text, press release date, and contact information, the particular content item 88 could include property values 86 for the text of the particular press release, the date on which the press release was issued, and the name and telephone number for a contact related to that press release. As shown in FIG. 2, a single content definition 82 may have multiple content items 88. Thus, a company could produce one content definition 82 for all of its press releases, and could have many press releases (entered as content items 88) in its system that relate to that particular content definition 82. Advantageously, with the benefit of content definition 82, authors of content need only create the content itself without concern for formatting issues.

The content items 88 and content definitions 82 provide structure for organizing and manipulating the content, but provide little or no information regarding the format in which the content is to be published. In this manner, the content can be stored in a simple, compact form that requires little storage space and enables easier sharing of content items 88 from one system to another. For example, because the content does not carry the overhead of formatting information, different systems can easily share content through simple text file transfers. In addition, the content can be more easily indexed, and can be searched more quickly because it does not include accompanying formatting information.

The formatting information is provided through template 90. Template 90 may take the general form of a Hypertext Mark-Up Language (HTML) document. In particular, template 90 may use Extensible Mark-Up Language (XML) tags to associate the display of information with a particular content definition 82. Template 90 may be generated in a simple text editor, or through a commercial web development tool, such as Microsoft FrontPage® or MacroMedia Dreamweaver®, or may be imported from or exported to, one of those programs. As a result, the system permits various levels of simplicity and flexibility in developing the formatting information.

A given content definition 82 may be associated with more than one template 90. For example, each template could be established to produce the content for a particular target device, target application, or target user, among other things. The developer of the content or another user of the system may be allowed to define or specify various intended targets for the content and may establish templates 90 for each target. For example, a content producer could define two content items 88, designating one for publication to a desktop workstation and one to a handheld device. Alternatively, a single content item 88 could be published differently depending on the intended target. Each template 90 may be related to a content definition 82 from which the template 90 is intended to publish, and can be related to one or more targets to which the template 90 is intended to publish. Examples of various features on which target differentiation may be desired include: differences in format for target devices (e.g., workstation, PDA, or WAP), differences in display types or sizes, speed of communications connection, type of encoded result (e.g., HTML, XML, or custom), or static results versus dynamic results (e.g., a web page that is placed on a server versus a web page that is generated in response to an HTTP request). In general, the number of targets may be open-ended and may be defined by the user.

The information represented by content items 88 is provided to consumers through publishing engine 92. Upon a request for particular content, publishing engine 92 accesses template 90 related to that content, and also accesses the requested content item 88. Publishing engine 92 merges content item 88 into template 90 to create a formatted version of content item 88. Publishing engine 92 may then provide that information, for example, in the form of a web page 94. Web page 94 may be viewed by a consumer using any of a number of viewing applications, such as a web browser. The content may be published dynamically in response to a particular request for information, it may be published beforehand and stored statically until there is a request for the information, or it may be published using a combination of the two. For example, in static publishing, the publishing engine 92 may be given a list of targets by an automatic scheduler. The publishing engine 92 may then create a Web page for each of the targets using data from the content items that are associated with the particular template 90.

This structure for the system also permits flexibility in changing the formatting of content. The format of content that has the same repeated format may be altered simply by changing a single formatting definition, and all of the affected content may be republished using the new formatting.

Figure 3A:
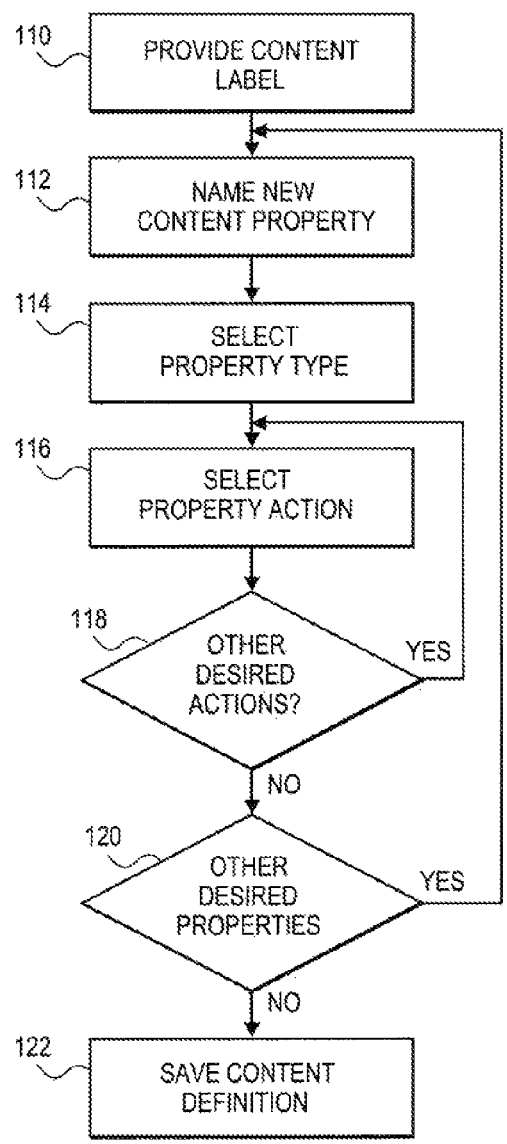
FIG. 3A is a flow diagram illustrating the entry of content definition parameters by a user of a content management system.

FIG. 3A is a flow diagram illustrating the entry of content definition parameters by a user of a content management system. As a first step, the content definition may be provided with a content label, as in block 10. The content label may be used as a name to identify the particular content definition.

The content definition may then be provided with a number of properties that define the structure of that content, as shown in block 112. Once a new property is named, a property type may be applied to that property, as in block 114. A property type may also be changed by a user after it is first selected, or the order in which a number of property types appear may be changed. The property type may be selected from a number of predefined property types, such as text, file, or numeric. A property type may be absolute, such as a string of text, or it may depend on the values of other information. For example, a property could obtain information from other properties or from external sources, and could perform a mathematical operation on those other properties. A property type could also be used to publish from, and otherwise manage, resources external to the main system. To do so, the system may create a content item that contains metadata about the external resource, where the property is part of that metadata.

For each property, a user may select one or more property actions 116. The property actions 116 may allow a user to alter the properties, for example, by changing the property's type, changing the property's name, or reordering several properties. If the user desires to apply additional actions, as indicated by block 118, the user may do so. In addition, as shown by block 120, additional properties may be defined for a particular content definition. When all information has been entered, the content definition may be saved as shown by block 122.

Properties may also be assigned various attributes. For example, a property may be assigned an "instruction," which may be text or other features that can be edited in the property definition and is designed to appear when the content editor is in use. A property may also be assigned a "permission," which may control the ability to view or edit a particular property value based, for instance, on a user's identity or membership in a particular group (e.g., system administrators). In addition, a property value may be given a validation that constrains the range of values the property may take on, or otherwise restricts the values for the property or prevents a property from being updated unless it contains properly validated values.

The content definition process may take place in a number of ways. For example, although FIG. 3A shows the definition of content in a particular order, the provision of a content label, content properties, property types, and property actions, may occur in any desired order. For example, a user may provide names for a number of properties and may then provide a label for the content definition. In addition, any of the particular features of the content definition could be omitted in appropriate circumstances or could be generated automatically based on other information that is accessible to the content management system. Furthermore, the content definition may be updated as needed, to accommodate new information.

Although the content definition process has been described as involving interaction with a user, it could also occur in other ways. For example, the content could be defined by importing content definition information, for example, in comma-delimited format, to the content management system. The information passed to the system could also be generated through an automatic process, for example, by a macro or other program that receives inputs from a remote automated system. Thus, by simplifying the process for defining content, the system may provide improved interaction both for a human user or for a programmed machine.

Figure 3B:
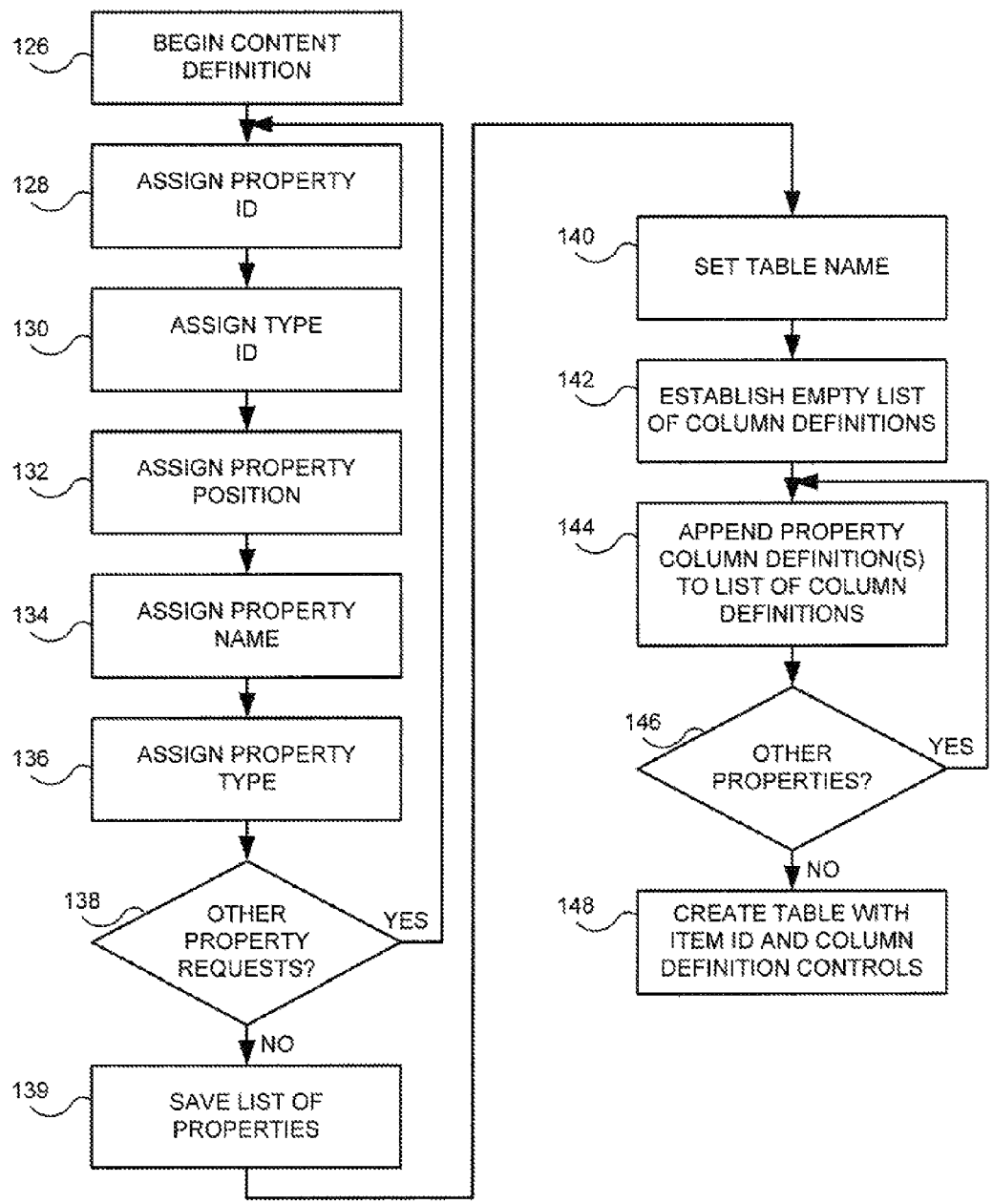
FIG. 3B is a flow diagram illustrating the creation of data structures in a database in response to content definition parameters.

FIG. 3B is a flow diagram illustrating the creation of data structures in a database in response to content definition parameters that are provided to the system. In general, the system accepts high-level concepts that can be understood by a user of the system and converts those concepts to more specific low-level information that can be processed by a database in the system. Thus, a data structure generator that carries out the process in FIG. 3B may permit the creation of complicated data structures without the need for specialized programming.

In the embodiment in FIG. 3B, the content definition information is stored in a list of properties, and a table that corresponds to the properties is then created. However, the invention is not limited to the order in which the steps are performed, and it is not limited to the particular steps shown in the FIG. 3B.

The content definition process begins at block 126. In an initial step, the properties for the particular content definition are gathered (by a user or otherwise) as described above. Each content definition may have zero or more properties, and each property may be assigned one or more attributes. A Property ID attribute, assigned in box 128, may be a unique identifier for the property, and make take the form of a unique integer. A Type ID attribute, assigned in box 130, is a unique identifier for the definition that shows the content definition to which the property is related. A Property Position attribute may be assigned at box 132, and may represent the position of the property relative to the other properties in the content definition. By using the Property Position attributes of the various properties, a user may order the properties in the content definition editor, so that the properties are presented in a particular manner. A Property Name may also be assigned to a property at box 134.

Other attributes may also be assigned to properties. For example, at box 136, a Property Type attribute is assigned to a property to represent the type of entry that is stored in the property. Property types can be integer, date, file, image, short text, long text, binary, floating point, item, list or any other appropriate type. As described below, two particular property types, the item and list types, permit the creation of a content item that references another content item, and the creation of a collection or list of items, respectively.

Referring again to FIG. 3B, once a property has been assigned its attributes, the system determines at box 138 whether other properties remain that need to be assigned attributes. If there is such a property, the system assigns attributes to it as described above and adds the new property to the list of properties. If there are no remaining properties to receive attributes, the system saves the list of properties, as shown at box 139, and proceeds to create a table that will be used to store content items that relate to the particular content definition.

In the table creation process, a name for the table is first computed at box 140. An empty list of column definitions may be created at box 142. A column definition may comprise a column name and a column type for a column within the content definition database table. Each property may have one of more column definitions that are used to describe the property. For example, a file property may have column definitions of integer and character type to store a unique identification number for the file and the file name, respectively. Thus, for each property, one or more column definitions may be added to the list of column definitions as shown at box 144, until no other properties remain, as determined at box 146. When the properties have all been processed, a table containing a column corresponding to each column definition may be created.

As noted, the table may be created to include a column to store unique identifiers for each content item in the table, plus one or more columns for each property in the content definition. The column names in the table may correspond to the unique identifier for each property. For properties of the list, or collection, property type, a separate table may be used to store the content item information. Properties of the item property type may be stored as a collection of one. As one example, a user may create a content definition having eight properties that correspond to eight of the property types listed above. Table 1 represents the database schema that could be generated from such input, where the <PropertyID> designation represents a unique identifier for the particular property.

TABLE 1

Example of Content Definition Database Schema

| Field | Column Name(s) | Column Data Type(s) | Description |
|---|---|---|---|
| Id | ItemId | INTEGER | Content Item's unique id |
| Integer | Prop_<PropertyId> | INTEGER | |
| Date | Prop_<PropertyId> | DATE | |
| File | Prop_<PropertyId>_fileId | INTEGER | File's unique id |
| | Prop_<PropertyId>_fileName | VARCHAR(255) | File's name |
| Image | Prop_<PropertyId>_fileId | INTEGER | Image's unique file id |
| | Prop_<PropertyId>_fileName | VARCHAR(255) | Image's filename |
| | Prop_<PropertyId>_hSize | INTEGER | Image's width |
| | Prop_<PropertyId>_vSize | INTEGER | Image's height |
| Short Text | Prop_<PropertyId> | VARCHAR(255) | |
| Long Text | Prop_<PropertyId> | LONGVARCHAR | |
| Item | Prop_<PropertyId> | INTEGER | Collection's unique id |
| Collection | Prop_<PropertyId> | INTEGER | Collection's unique id |

The database schema generation and the other features of the system may be produced using any of a variety of programming languages. For example, the Java and Javascript languages are suitable languages for creating the system because they are widely known, they are good languages for performing system development, they are relatively flexible, and they are portable, in that programs written in these languages can be used with minimal or no modification on numerous computer systems. Other suitable programming languages and development tools will be familiar to a skilled artisan.

Figure 4A:
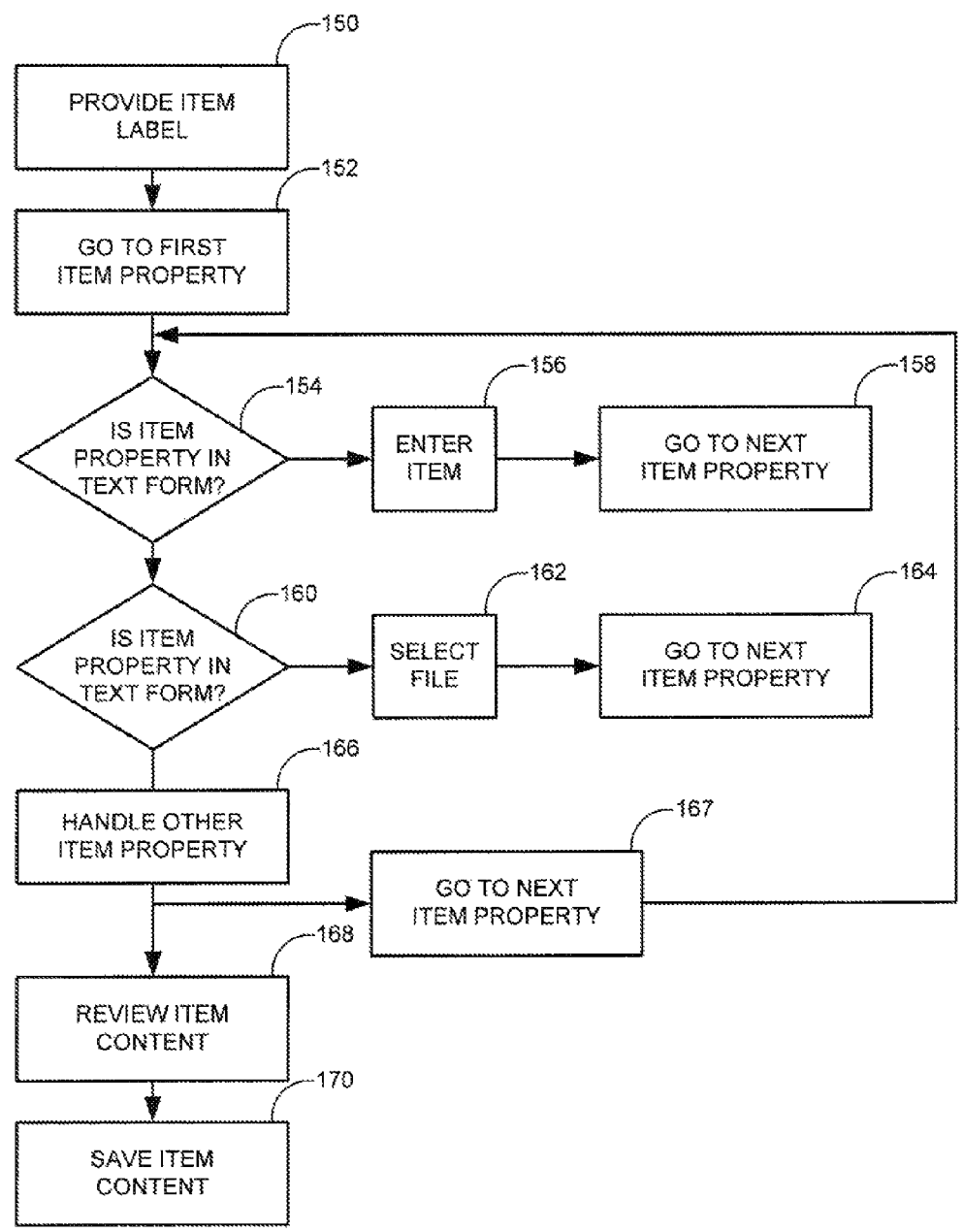
FIG. 4A is a flow diagram illustrating the entry of content items to a content data structure.

FIG. 4A is a flow diagram illustrating the entry of content items to a content data structure. As previously mentioned, each content item may represent an instance of a particular content definition. For example, a content item could include the days' headlines, to be published as part of a content definition for the front page of a newspaper. In the illustrated embodiment, a particular content data structure has already been established to receive content items. At block 150, a user provides a label for the content item, such as the title of a press release. At block 152, the user moves to the first property defined by the content definition, and determines, at blocks 154, 160, whether the property has a text type or a file type, respectively. If the property has a text type, the user enters the text for the item at block 156 and moves to the next property at block 158. The text may be entered any of a number of ways, including by typing directly into a text box provided on an input form, or by pasting or importing from another application. If the property has a file type, the user may be directed to select a file at block 162 that is to be related to that item and then may proceed to the next property at block 164.

The system can also work with property types other than text and file types. For instance, a property could be defined to point to another content item. In this manner, a hyperlink could be established between one content item and another content item. Thus, when the first content item is published to a consumer, the consumer could click on the hyperlink and be brought to the second content item. In the described embodiment, the "item" property type links one content item to another content item. In such a manner, a hyperlink may be published by the system. Various different content item properties can be handled as shown by box 166, and the system may move to the next property as shown at box 167.

A set of item properties (zero or more) in an implied sequence may be referred to as a "list." Lists may be displayed in their list form, for example, as a row of bulleted features, and they can be filtered by applying criteria that determine which list elements will be published. As with an item, a list (or parts of a list) may be used to link references to content items. Also, items and lists may be useful to publish content that is located in many different places, whether in the same or in different databases. In this manner, a "parent" content item may be related to "child" items and list properties, and may gather data from its children. In this manner, a separate content item could be assigned to each distinct portion of a web page. As a result, content may be easily aggregated and the content may be entered by many different groups. Also, the different sections of a web page could be combined in different ways depending on the target to which the content is being published (using multiple templates, for instance). Finally, lists and items may be associated with a specific type or types of content so that the list or item may only contain content of that type.

Items and lists may be automated. Scheduled publishing may be performed through items and lists, so that certain members of a list may be set to expire on the occurrence of a certain event. For example, a link to an employee's resume on a web site could be caused to expire on the occurrence of a "termination" signal from a human resources application at a company. Items and lists could also be associated with external files, so that metadata content items could be formed in the system database with references to those items, and the references could be placed in an item or list. As an alternative, an item or list could also be associated with an external stream in a similar manner, but by taking input from a communication protocol with another system, for example, as used to aggregate content. Furthermore, lists may be associated with certain search results, such as content search results. And they may also be associated with web site navigation, so that a site may be automatically updated and rebuilt, such as when a major new page is added. Finally, lists may be associated with other actions, so that, for example, a content item can be linked automatically into workflow or navigation applications when it is created.

During the process of entering a content item, a user may also preview that item in published form. The previewing process may apply formatting information from a predefined template to the content that the user has just entered, so that the user may see how the content will look when it is finally published. The user may then modify the content item if necessary and preview it again to check the results. As shown by block 170, the user may save the content item once the user is satisfied with it. Alternatively, the additions or changes to the content item may be saved automatically by the system. A user may publish the content item, for example to a web site, once the user is satisfied with the content.

While the content item entry process can be conducted by a user of the system, it could also be partially or fully automated. For example, a user could select one of a number of choices and the content item could be filled in by referring to a look-up table or other similar structure. Alternatively, a user could initiate a macro that would populate the content item, for example, by making decisions based on other content items or on then-current system variables. For fully automated entry of a content item, the system could be programmed to retrieve certain content in response to a predetermined input or on a particular schedule. For example, the system could retrieve news items from a central database, or could collect news items from scattered data sources, on a scheduled basis.

The content management system may provide security over the content definition, the content item entry steps, and other aspects of the system. For example, an administrator of the system may create a separate login for each user and place users into security groups. Alternatively, the system may receive external identification information for each user. Each user can be assigned a role that defines the privileges available to the user, including the ability to make changes to the system. Content can also be assigned individual permissions, which determine whether a particular user may access, update, or publish particular content items, to provide a second level of security. Permissions may be established so that they are inherited and need only be applied at a high level. For example, in a hierarchical system organized with folders, all of the content items in a particular subfolder could be given the same permission so that particular users could have no access to the content items in the subfolder or could have read-only access to those items. Also, permissions may be granted or denied for an entire group or for an individual user. In this manner, exclusive access to edit a particular set of templates could be given only to employees in one department of a company.

Figure 4B:
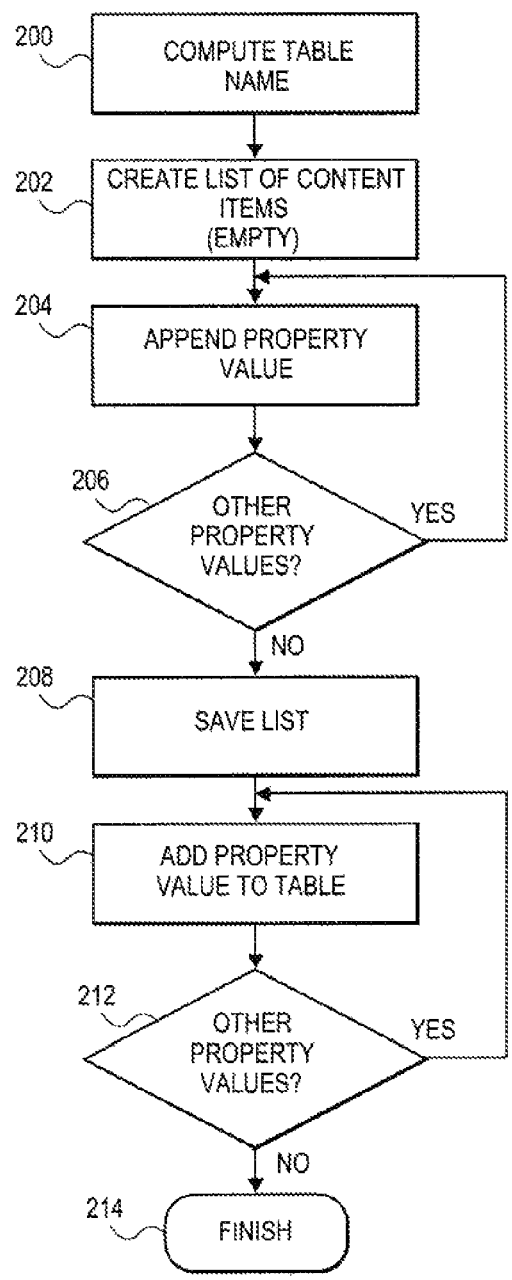
FIG. 4B is a flow diagram illustrating the operations that occur when content items are added to a content data structure.

FIG. 4B is a flow diagram illustrating the operations that occur when content items are added as instances in a content data structure. A content definition table to which the content item corresponds may first be computed from the content definition to which the content item corresponds, as shown by box 200. The table naming process may follow a predefined format, so that the table name computed at box 200 matches the name of the relevant content definition table. An empty list of content item property values may then be created, as shown by box 202, and property values may be added iteratively as shown by box 204, until no property values remain to be added, as determined at box 206. The list of property values may then be saved, as shown by box 208. Saving the list of property values separately from the table may permit easier access to particular aspects of the property values.

The property values for the particular content may then be added iteratively to the content definition table until all of the property values have been added as shown at boxes 210, 212, 214. Alternatively, the system could stop adding information to the table based on some other criteria, such as an entry by a user, or could even limit the properties that may be modified by a particular user for security or workflow reasons. Although the information may be added to the table at the end of the process, each property can also be added as the process progresses, and some properties might not be entered at all. In addition, although the content item entry process has been described as a manual process, any part or all of the process could be partially or fully automated.

After a content item is created, it may be managed by a workflow system. The workflow system may be programmed to route a content item to various sources, such as supervisors who have to approve certain content before publication. The manner in which a content item is managed can depend on the content definition, the information in the content item, a choice made by the creator of the content, or by rules based, for example, on the identity of the creator of the content. In one embodiment, a content creator could be a junior reporter whose content items are automatically routed through an editorial department before they are published. The content items could be routed in different manners depending on whether they are high-priority, are intended to be published to particular sources, or if they cover a particular topic.

In one embodiment, the workflow may be managed by enumeration properties, workflow metadata, and content searches. Enumeration properties permit a user to provide a fixed value for certain content item property values. For example, a particular content item could be limited to a selection of the various state abbreviations by pre-selecting those abbreviations. Enumeration values may be named and saved separately, so that they may be accessed when entering various types of content items. An enumeration property may be exclusive so that only one value (plus nul) may be selected, or it may be inclusive so that several values may be selected (e.g., a list of check boxes).

Workflow metadata serve to define properties that should be tracked for all content items. The metadata may include a number of properties, including a state enumeration, a user enumeration, and a comment field. The properties are managed so that they appear to a user to be associated with each individual content item.

Content searches permit the searching of content items in a system. Driven by the content definitions, the searcher indicates the properties against which a search may be conducted, and multiple types of content definitions may be searched at a single time. The search may also be restricted by content permissions, and may be restricted to a particular subset of content. A search may return a set of content items that match the search criteria. The user may examine the list, convert it into a list for publishing, or pass it to the application for internal use, such as for workflow management.

Workflow configuration may comprise the definition of an enumeration that describes all the locations or states that content may inhabit, and the placement of the enumeration in the corresponding workflow metadata. Content searches may then be run for each user, so that the user is presented with the result of the search. To manage the workflow, each user may create workflow metadata during the creation and review of content. For example, a journalist could create a news story and mark it as a "draft." As long as the story stays a draft, it will be displayed on the journalist's home page. Once the content item is changed to "proof," it may be altered to be displayed on a proofreader's home page. In addition, e-mail notifications may be triggered by the transition of a content item from one state to another in the workflow.

The system may also be provided with functionality to check how content will be published before it is published. While entering content into a content item, a user may choose to preview that data as published, for example, in a web page. The system may allow the user to move from page to page within a web site that is in the stages of development, and select the current page for immediate editing. In this manner, the user may be taken to a content item editor so that the user may modify the data. In the editor, the user may make changes and may continue the preview. In addition, a user, when previewing a site, may be given the option of automatically creating a new content item that is the same as the item being previewed, so that the user may receive a head-start on creating a content item. To enable the user to jump easily between preview and editing modes, a label, such as a Javascript fragment, may be included with each preview page that identifies the page to the system. Alternatively, the identification information could be embedded in a passive comment so that the editing process can also be run on published files in addition to previewed files.

Figure 5:
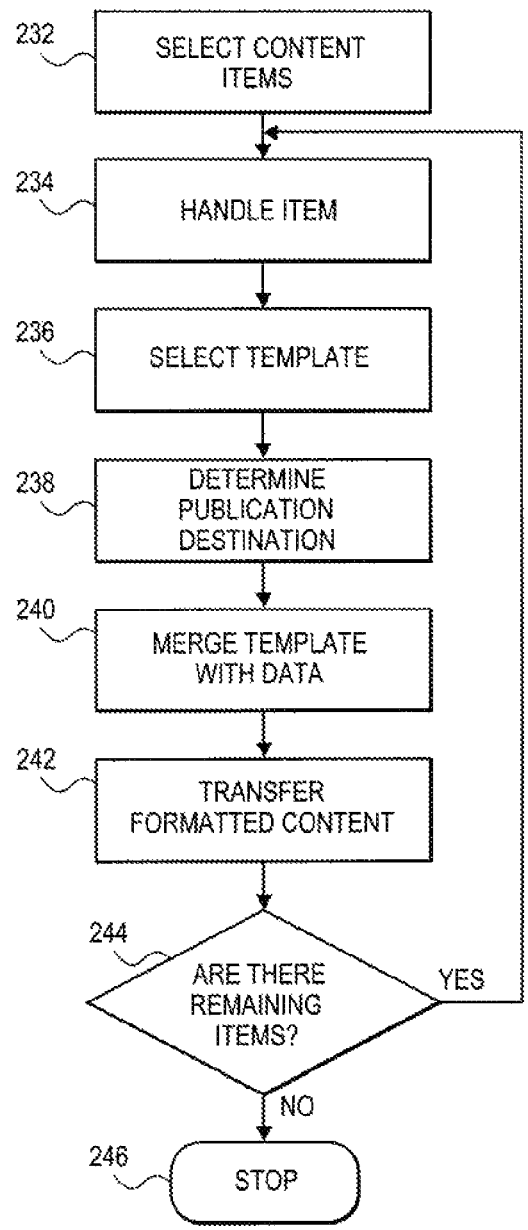
FIG. 5 is a flow diagram illustrating the publication of content in a formatted manner.

FIG. 5 is a flow diagram illustrating the publication of content in a formatted manner in one embodiment. As shown in block 232, a set of content items that are to be published may be selected. This set may consist of a single item or multiple items. The selection may be made manually or automatically. For example, a database query may be used to return values or database entries that correspond to particular content items such as current climatic data for a weather web page. The content items may be stored in a single database or may be located in various locations. Content items may also be arranged in a single folder and the folder may be selected for publication. In addition, any content items in a subfolder of the selected folder may also be published.

In block 234, a content item is passed to the publishing engine. Each content item may be passed individually or multiple items may be passed together. When the publishing engine receives the content item, it matches a template to the content item, as shown in block 236. For example, the content item may contain an entry that refers to a particular template or it may correspond to a content definition that contains such an entry. When the content item is known or suspected beforehand to correspond to a particular template, the template may be selected before the content item is passed. Information in the content item, the content definition, or the template can be used to determine a destination for publishing the content item, as shown in block 238. For example, a template for a particular target device or a particular target user could direct the publication of any content merged with the template to be directed to a server for the particular target. The destination information may also be prioritized. For example, if destination information in a content item does not match destination information in a template, decision rules may be used to determine the destination for the formatted content. In addition, destination information may be calculated based on input from the content item, the template, or elsewhere.

In the final phase of the publishing process shown in FIG. 5, the template is merged with the content item information and is transferred. In block 240, the template and data are merged. The data from the relevant content item may be merged, and in addition, data from other content items that are linked or related to the relevant content item may be merged. As described below, the template may be compiled into an intermediate form as a parse tree. To merge the template with the data, the publishing engine may interpret the intermediate form of the compiled template by traversing the parse tree and may carry out an appropriate action for each node that it encounters during the traversal. For example, a node may direct the copying of a section of the template source text to a generated web page or direct the look-up of a property name in the content definition along with the integration of the corresponding content item value into a web page. The interpretation process may involve calculation or comparison, decision-making, or looping, in the same manner in which these processes are carried out in other programming languages. For example, the interpretation of a node may cause other templates to be invoked in the same manner as if the source text was part of the template. Alternatively, a node may cause other content items to be published so that the items are inserted into the page as it is being produced. The system may generate an error message, for example to a system log file, if the publishing engine encounters a node that is unrecognized or contains errors. The system may pass over nodes with errors so that the errors are not directly shown in the formatted content.

In block 242, the formatted information is transferred to the destination location, for example, using a standard protocol such as file transfer protocol (FTP). Templates may be created in a numbers of ways and at any time. Each template may be associated with one or more content definitions. In addition, a template may be self-contained or may be linked to other templates, either directly or in a cascading manner. A template may be written in any of a number of languages, including standard document mark-up languages. In one embodiment, the template may be an HTML document. As such, the template could be created in a basic text editor or in a customized HTML coding application, including applications such as Microsoft FrontPage® and MacroMedia DreamWeaver®. Each template may contain information regarding the language in which the template is written. The literal content of the template document may be replaced with tags that relate to content definitions in the content management system. The tags may be standard mark-up tags, or they may be custom tags developed specifically for the content management system.

A template may be stored in the system in a compiled format, different from the source text of the template. The source text may also be stored with the compiled information. A system that has templates in a variety of languages may use a variety of compilers. The system may look to information in the template that indicates the language in which the template is written in order to determine which compiler to invoke. In one embodiment, the template may include XML tags, and the compiler may search the template source text for XML tags that match the pattern of predetermined tags. The compiler may check such tags for correct syntax and may repair any problems, or may report errors and warnings to the user. Tags that are not part of the template language may be passed over and handled like other information in the template. The compiling process may produce a template in intermediate form that comprises a "parse tree" of nodes linked together, and that represents the grammatical structure with respect to the relevant XML tags in the source text. Additional tags may be added to the system and procedures for compiling the tags may also be added, so that the types of nodes in the parse tree may be open-ended in number and type.

In general, during a publishing operation, when the publishing system encounters a tag that it recognizes within a template, the tag itself is not emitted into the output. Instead, the tag is evaluated to produce replacement text or objects that are then emitted into the output.

Tags may contain one or more expressions that are evaluated while the template is processed. The evaluation of an expression may produce a result, such as a number or character string. The syntax of such expressions can have features common among many programming languages, such as arithmetic, reference to variables, or string manipulations. An expression may include names that correspond to properties in content definitions. Such a name may be resolved to the current value of the similarly-named property in the content item. If such properties are references to other content items, they may be chained together in a sequence, for example "book.author.biography," that follows the linkages among successive content items. Expressions may contain special names that are not actually property names of a content item, but are instead defined as special cases that compute some aspect of a content item. For example, when publishing HTML web pages, and encountering the name "location" in an expression, even though the content item may contain no property named "location," the system may compute as its value the uniform resource locator (URL) to which the content item will be published, and may thus allow the published output to contain correct hyperlinks to other web pages published from other content items within the system. An expression may also include the means to select one element out of a collection or list by providing the expression with an integer value.

Any of a number of specialized tags may be useful to the publishing process. For example, one tag may simply be replaced by the results of an expression that is evaluated. Another tag may allow the result of an expression to be stored back into the database, and may affect the value of properties in content items. Such a tag could have one expression to determine the value, and another expression to determine where the result is to be stored in the database. Yet another tag could allow the results of an expression to be saved as a named temporary variable. Such a variable could be referenced by other expression elsewhere in the template during the publishing process. Some tags may also cause temporary variables to be given values as side effects of evaluating that tag.

Other tags may provide for links within a system. For example, a tag in an original template may use an expression to locate a different template within the system, for instance, by identifying a path through a folder hierarchy leading to the second template. The second template may be treated as if it were included into the original template instead of in the tag itself. This may allow any number of templates to share the effects of other, common templates. The inclusion of one template within another may proceed to multiple depths. This functionality can be used to achieve the effects of "call" statements in many common programming languages.

Another linking tag may use an expression to locate a different content item within the system, for instance, by identifying a path through the folder hierarchy leading to the other content item, or by evaluating a chained sequence of item reference properties. The identified content item may then be processed as if it were being published, and the resulting output may replace the tag. The insertion of one publishing operation inside another may proceed to multiple depths.

Another tag may repeatedly evaluate its contents, causing the same section of template to be repeated a number of times. Each iteration may have some conditions automatically altered so that there are desirable variations among the repeated sections of output. For example, the tag may contain expressions that evaluate lists of other content items. Each iteration may access different items from these lists, for example, by assigning them to one or more loop iteration variables. Also a "loop index" counter representing which iteration is in process may be associated with a temporary variable name. The number of iterations may be determined by expressions in the tag, or may be generated automatically based on the number of elements found in the lists at the time of processing. The list elements or loop indexes may be processed in sequential order, or may be given a special ordering determined by other expressions in the tag. All of the list elements or loop indexes may be processed, or only a subset of them may be processed, depending on the results returned from evaluating an expression in the tag.

Another tag may identify one or more subsections of the template. The result of evaluating an expression in the tag may determine which of those subsections are processed normally and which are omitted. This functionality can be used to achieve the effects of "if-else" and "case" statements in many common programming languages.

Another tag may initiate communications with an external system in order to retrieve data that should be inserted into the results at the tag's location. Alternatively, information may be sent to the external system. Expressions within the tag or the contents of the tag may determine the identity of the external system, the protocol used to communicate with that system (e.g., HTTP, Java RMI, FTP, COM, SOAP), the data to be transferred, and any other parameters needed by that external system to accomplish the desired result.

The evaluation of some tags may induce the creation, deletion, renaming, or other effects on content items, content definitions, folders, templates, or other aspects of the database or elements stored in the database. Tags can be defined that could cause any effect that the system is capable of producing, including affecting timed or scheduled publishing of other items. Thus, the evaluation of tags during publishing can automatically effect changes to the system that would normally be the results of user actions.

Publication may be managed in a number of ways. For example, publication may be scheduled to occur at a particular time or upon the occurrence of a particular event. In addition, publication may be target-device dependent, in that the template used to publish particular content may depend on whether the publication request has been made from a graphics workstation or a wireless handheld device. In addition, the content that is published may be altered or limited based on the type of device that is requesting the content.

The content may be published either statically and stored on the system for later requests, or it may be published dynamically in response to a request for publication from a user. The content may also be published dynamically the first time it is requested and then stored for later requests.

Publication can be direct to a Web site or may be provided with translation. As an example, the content may be filtered either before or after it is merged with the template to remove content that could prevent the information from displaying properly. Certain types of content could also be filtered out. Furthermore, the content could be translated, for instance, from one language to another.

FIGS. 6-9 illustrate web browser windows with web pages displayed to show particular aspects of a content management system. In one embodiment, every component of the system may be accessed through a Web browser. Each of the components shown in FIGS. 6-9 may also be organized to operate in a "naked browser"—a browser that is not provided with any special plug-ins or other specialized application information on the device that are not generally supplied with the browser. For example, the components could be written by using XML or Dynamic Hypertext Mark-Up Language (DHTML). As a result, a user of the content management system could access the system from any location that has a Web browser, without needing to download any application code to the local system. Also, the system may operate on ultra-thin clients that do not have storage resources to store large blocks of application code locally. Furthermore, updates to the system are more easily implemented when all of the application and data code is stored centrally. And because the client does not need special software, the system can be accessed by clients having limited resources, such as wireless portable devices.

Figure 6:
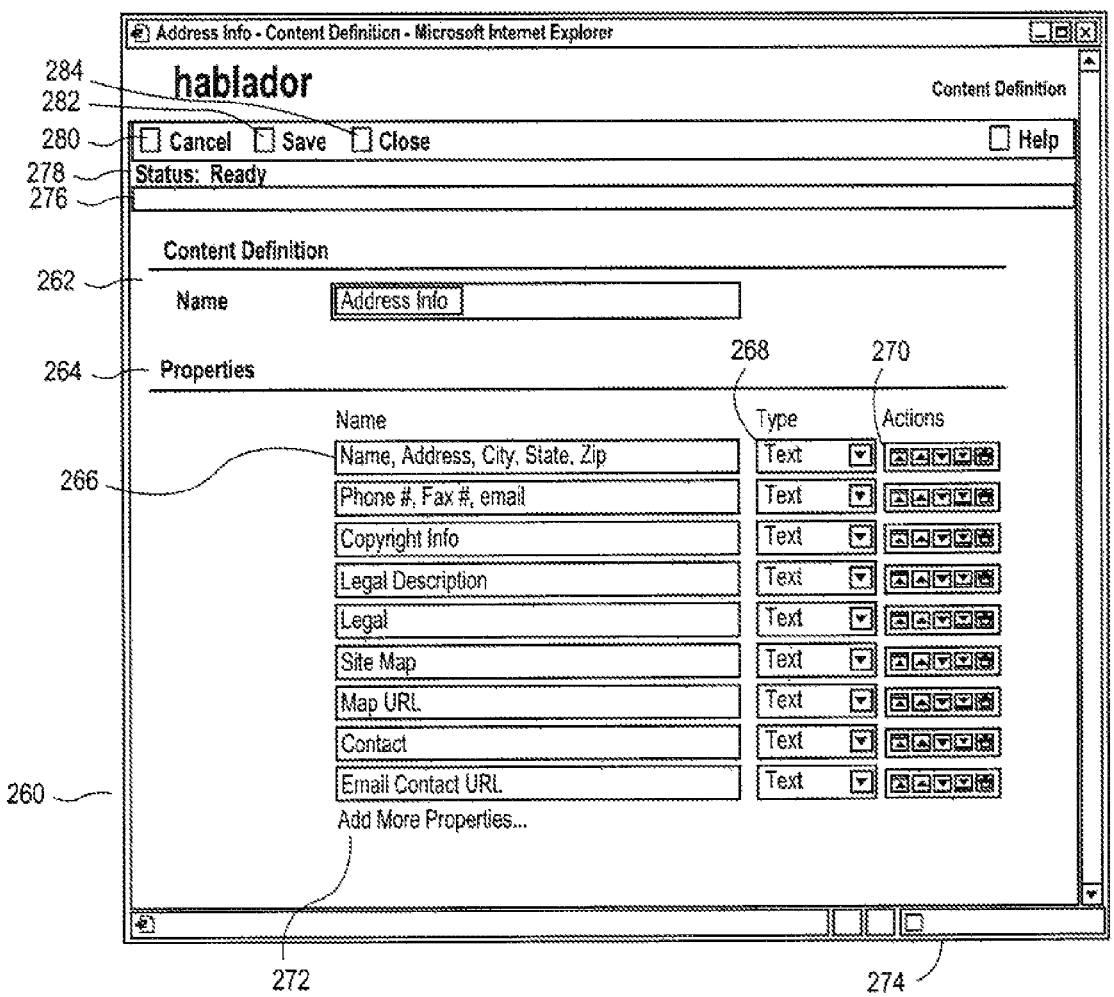
FIG. 6 illustrates a web browser window in which a content definition screen is displayed.

Referring now to FIG. 6, a content definition screen 260 is provided to a user for entry of content definition information. The user may provide a name 262 for the particular content definition, so that the content definition may be identified later. In addition, the user may select a number of properties 264 for the content definition. In FIG. 6, property 266 represents an address property, including a name, address, city, state, and zip code. The property type 268 is text. Property actions 270 are also available for that property. A user may add additional properties by selecting choice 272. Indicator 274 shows that the user is accessing the content management system through a local intranet. As indicated previously, the user could also access the content management system through the Internet or by other means.

The content definition screen 260 also provides the user with several options concerning how to handle the content definition. Cancel button 280 permits the user to stop the content definition process without saving the current content definition information. Save button 282 allows the user to save the current content information and continue adding to or editing the content definition information. Close button 284 allows the user to end the current content definition session, and provides the user with the option of saving any changes that have been made during the current session.

Figure 7A:
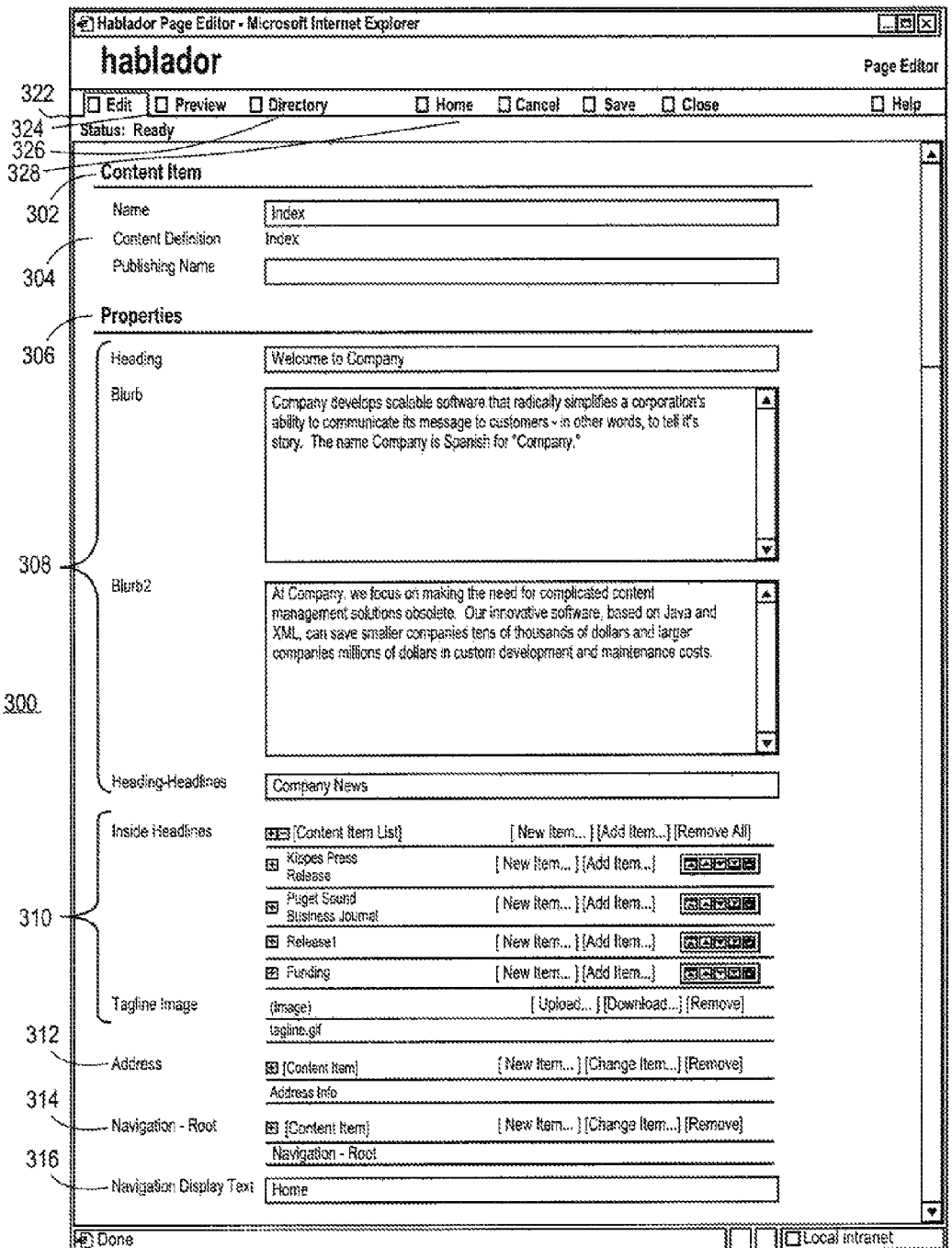
FIG. 7A illustrates a web browser window in which a content editor screen is displayed.

FIG. 7A illustrates a web browser window in which a content editor screen 300 is displayed. By accessing the content editor screen 300, a producer of content may provide that content to the content management system. The user enters the information as a content item 302, for which the user may provide a name, content definition, and publishing name 304. The content editor screen 300 displays the various properties 306 that have been previously established for the class of content as part of the content definition process. Properties 308 are various text properties relating to a piece of corporate information to be displayed on a web site. Property 310 is a file property type that relates to a graphic file to be displayed with the text content.

Properties 312 are item property types that point to other content items in the content management system, and an image property type that corresponds to a graphic file that can be accessed by the system. When a content item has one or more item properties 312, the property may hold a value of another content item in the system The latter content item is then referenced by the original content item's property, so that the original content item points or links to the referenced item. The linkage may be maintained intact even if the referenced item is moved or renamed. In the illustrated case, the item is address information, and is published to the web site so that a hyperlink to the address information is provided on the published web page. The address information may be stored in the same database as the other data in the content management system, or it may be stored in a separate database or separate computer system. Property 314 is also an item property type and relates to the navigation root for the content item. Property 316 is a text property type that corresponds to property 314.

Linkages between content items can provide added functionality for the system. For example, by providing linkages between various content items, information may be published in a variety of forms without requiring multiple instances of a content item that contains the information. In addition, the linkages may be layered to any depth to provide added functionality. In addition, the system may compute the destination to which a particular linked item has been or will be published. Using the computed destination in conjunction with content item properties, the system can generate, during or outside of the publication process, hyperlinks embedded within published pages that link to other pages.

Figure 7B:
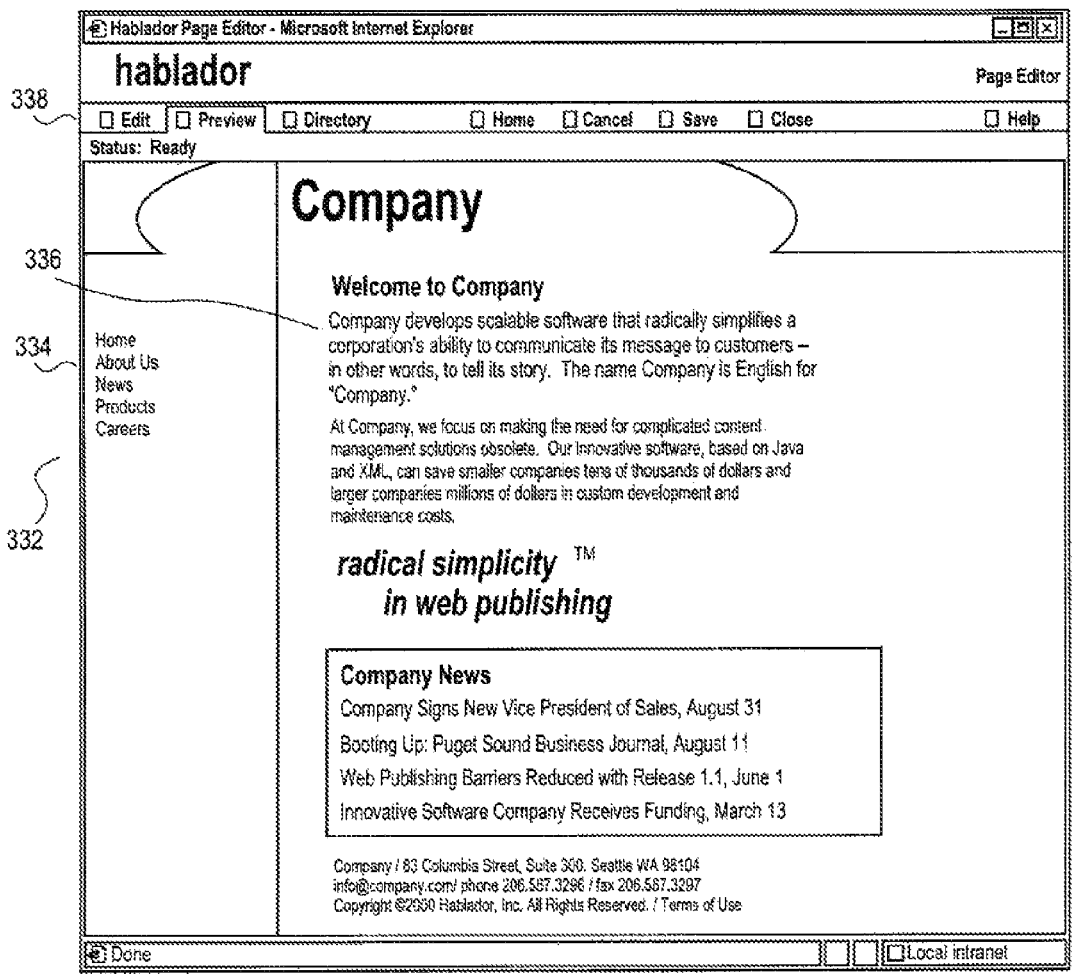
FIG. 7B illustrates a web browser window in which a preview of a formatted web page is displayed.

The status of the content editor session is displayed on content editor screen 300 at indicator 318, which shows that the content item is being edited over a local intranet. Alternatively, the content could be entered and edited over a wireless network, over the Internet, or in any of a number of other ways. Status indicator 322 shows that the system is ready to receive additional content information. Various control buttons provide the user to access other functions of the system. For example, preview button 324 may allow a user to preview formatted content, and directory button 326 may allow the user to view a directory of system resources. File management control buttons 326 may provide functionality similar to that for the same types of buttons described above. FIG. 7B illustrates a web browser window 332 in which a preview of a formatted web page is displayed. One set of content is displayed in main window 336, while other navigational content is displayed in side window 334. As indicated by status buttons 338, the web page is being displayed during an editing session as a previewed page.

Figure 8:
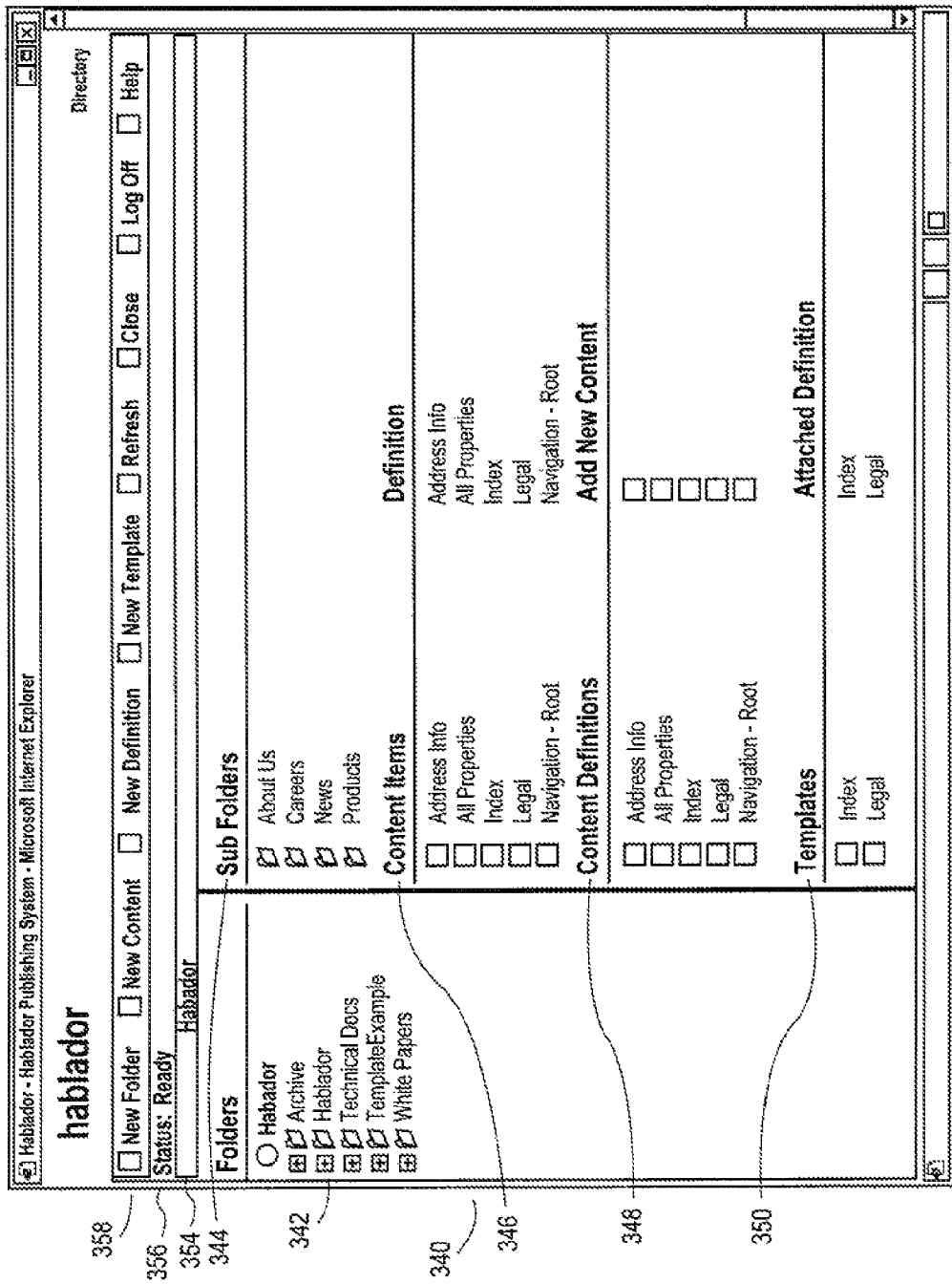
FIG. 8 illustrates a web browser window in which the organization of a content management system is displayed.

FIG. 8 illustrates a web browser window in which the organization of a content management system is displayed. Content organization display 340 consists of several distinct areas that permit control of content and its format, and show the organization of the content and format. The folders display 342 shows each of several folders that are available to a user who accesses the content management system. The folders may be established in a number of ways that best enable a user to track information. For example, a main folder may represent a particular web site to be published on the Internet. In addition, a particular folder may represent archived information or a particular type of document or content.

Each folder 342 may consist of a number of hierarchical subfolders 344, which may in turn contain subfolders. The subfolders could represent particular pages or subdirectories on a web site, or could represent particular chapters or sections within a book. In addition, each folder may contain a number of content items 346. These content items could represent particular pieces of content that are displayed on a particular web site or are published as part of a book. Each content item 346 may be listed both with it name and the content definition that corresponds to the item. Content definitions 348 that are applied within a folder may also be displayed. In addition, templates 350 for the folder may be displayed. In this manner, all of the relevant information relating to a particular folder may be accessed and organized under a single view. For example, a user with access to the content organization display 340 could click on an icon for an item presented on the display, and be taken directly to that item.

Figure 9:
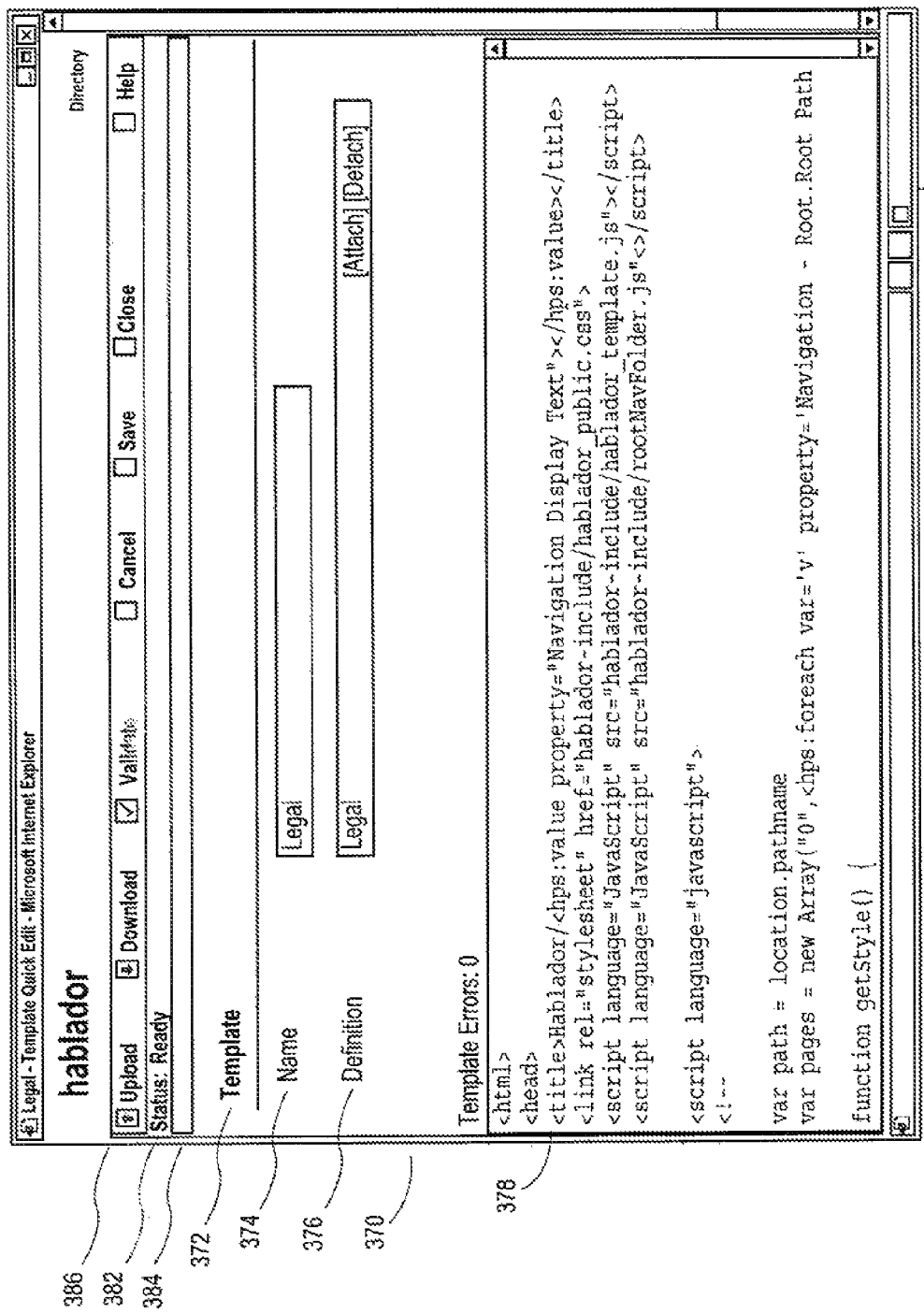
FIG. 9 illustrates a web browser window in which information relating to a template is displayed.

FIG. 9 illustrates a web browser window in which information relating to a template is displayed. Template edit display 370 contains areas for managing a particular template, for naming the template, and for editing the template. Template label 372 provides an indication that a template is being edited. Template name 374 may be entered by a user to provide a recognizable name for a particular template. Template editor window 378 shows the text of a particular template and provides a location for a user to edit the template.

A user may use template definition 376 to select a content definition to associate, or attach, to the template. The publishing engine may use this association to choose a template when publishing a particular content item. In particular, the publishing engine may look to the content definition that corresponds to a content item, and may then look to all templates that are associated with the relevant content definition. The selected set of templates may represent all templates that are appropriate for publishing content of the particular type. Alternatively, to select the appropriate template, preselected criteria may be applied to select the correct template or the best-fit template, or to eliminate templates that are not appropriate for the publishing operation. For example, a content definition may be associated with several templates, each of which is designed to publish information to a particular type of target device. When the publishing engine is called upon to publish content to one type of device or to a server for that type of device, the request for publication may specify the device type, which may control the template that is used. As an alternative, a template may be chosen from the group of templates arbitrarily, or a template may be chosen that is "closest" to the content item. One example of "closeness" is to measure the separation between the content item and the template when the system stores content items and templates in a hierarchical format. For instance, the system could look to the templates that are associated with content items that are stored in the same system folder as the content item of interest.

The association between a content item and a template may also be used to provide a user with feedback about possible mistakes in a template. For example, a template may contain an indicator, such as the name of a property value, that causes a particular property value of a content item to be published. If the content definition that is associated with the template does not contain a matching property, the system could provide a warning during the construction of the template to permit correction of any errors before publication. The system could also limit the entries that may be made to those entries that permit a proper associated between a content definition and a template. A user could override the warning if the template were intentionally created with a nonexistent property, for instance, if the property is to be added in the future. If a template is constructed to publish non-existent data, the publishing engine may publish nothing or may publish, or select, predefined alternative data in its place.

As shown in template editor window 378, a template may consist of HTML code or of other similar code that permits the publication formatting to be defined, including on the Internet. The text for the template may be obtained in a number of ways: entered through template editor window 378, provided from a text editor, or imported from a commercial web production tool. As previously described, the text for the template may be comprised of special indicators, such as XML tags, that direct the display of particular information on the template. In particular, the template may be established in such a manner that, by providing it with certain input variables during publication, it is directed to publish information from particular content items.

Template edit screen 370 also contains several indicators. Status indicator 382 shows that the template is ready for editing. Path indicator 384 shows under which path the template may be located. Indicator 380 shows that the template is being edited through a local intranet. The template could also be edited from a remote location, or could be imported from any location. Furthermore, the template could be generated in whole, or in part, by machine-based code. For example, the template could be organized graphically using a commercial web development tool, and the resulting code could be imported into the content management system. Once the code is imported, it could be altered, or could even be exported back to the web development tool. Alternatively, the web development tool could be integrated with the content management system to provide for simplified web development and permit easy updating of a web site.

A number of buttons 386 provide certain actions to be performed on the template. In particular, a user may upload a template from another program or may download a template to another program. In addition, the user may choose to validate an uploaded template to ensure it does not contain offensive code that will not run properly with the content management system. Finally a user may cancel, save, or close a template in the same manner as it may cancel, save, or close for the other content management systems screens.

A number of embodiments of the invention have been described. Nevertheless, it will be understood that various modifications may be made without departing from the spirit and scope of the invention. For example, where certain operations have been described as being carried out by a user, they could also be carried out by an automated process. Also, the system may store and handle the content and formatting information in any of a variety of ways. Accordingly, other embodiments are within the scope of the following claims.

We claim:

1. An integrated and modular content and format handling publishing system comprising a computer network including various sites connected by communication links, and various corresponding storage devices having computer-readable code embodied therein, including the following program components:
   (a) a content handling program component, comprising
      (i) a content definition editor that receives a content definition including one or more data types and one or more parameters for each data type, and being based on one or more content item properties each having an assigned ID and property type and being generated for each property in accordance with the property type and a property action;
      (ii) a data structure generator that produces a content data structure, the content data structure corresponding to the content definition;
      (iii) a content item editor that receives content item information, handles each said content item property, and provides the content item information for storage in the content data structure, and in connection with a same content item, the content definition editor and the content item editor are configured for implementation on a display in one or more network browser windows;
   (b) a format handling program component, comprising a template editor that generates formatting information for the content item information and stores the formatting information separately from the content item information;
   (c) a publisher program component that generates a formatted output based on a combination of the separately stored content item information and formatting information; and
   (d) a workflow system component for managing created content items for routing them each to one or more of various sources based on at least one of enumeration properties of the content items, workflow metadata defining properties of the content items to be tracked, and content search results, and
   (e) wherein a particular content item is published by the publisher program component according to a set of predetermined publication criteria.

2. The system of claim 1, wherein the content definition editor
   provides a blank content definition form to a user and receives the content definition from the user, and the data structure generator automatically produces the content data structure based on the content definition entered by the user.

3. The system of claim 1, wherein the content item editor provides a content item form to a user, the form corresponding to the content data structure and accepting content items that correspond to the content data structure.

4. The system of claim 1, wherein the content item and the formatting information are stored in separate databases.

5. The system of claim 1, wherein the content items are stored in the same database as the formatting information.

6. The system of claim 1, wherein the content definition editor permits the content data structure to be changed after the content data structure has been created and after one or more content items have been stored in the content data structure.

7. The system of claim 1, wherein the content item editor is accessible through a naked web browser.

8. The system of claim 7, wherein the content item editor is accessible through a public internet kiosk.

9. The system of claim 1, wherein the content item editor is accessible through a personal wireless device.

10. The system of claim 1, wherein the content definition editor, the content item editor, and the template editor are each accessible through a naked web browser.

11. The system of claim 1, wherein the template editor comprises a file import program component that receives the formatting information and transforms the formatting information into a form that is compatible with the system.

12. The system of claim 1, wherein the workflow system is managed by one or more enumeration properties, workflow data or content searches in a manner depending on said content definition, said content item information, a choice made by a content creator, or by rules, or combinations thereof.

13. The system of claim 1, wherein the publication criteria are generated automatically in response to parameters that are accessed from outside the system.

14. The system of claim 1, wherein the content item information refers to two or more different content items, thereby producing one or more links between the content items.

15. The system of claim 1, wherein the content item information is stored in multiple databases and is consolidated by the publisher.

16. A method of publishing formatted content including separately handling and formatting the content using a computer network including various sites connected by communication links, and various corresponding storage devices having computer-readable code embodied therein, the method comprising:
   (a) providing a content handling program component for
      (i) providing content definition parameters to a content definition editor that are based on one or more content item properties each having an assigned ID and types and each being generated in accordance with the property type and a property action;
      (ii) producing a content data structure in a database corresponding to the content definition parameters; and
      (iii) providing content item information to the content data structure, the content item information representing an instance of content that corresponds to the content definition parameters, and in connection with a same content item, the content definition parameters and the content item information are viewable on a display in one or more network browser windows; and
(b) providing a format handling program component for
 (iv) generating and storing formatting information separately from the content item information;
(c) providing a publisher program component for
 (v) consolidating multiple portions of content item information that are respectively stored in multiple databases; and
 (vi) publishing the content item information by combining the content item information and formatting information so as to present the content item information in a formatted manner; and
(d) providing a workflow system component for
 (vii) managing created content items for routing them each to one or more of various sources based on at least one of enumeration properties of the content items, workflow metadata defining properties of the content items to be tracked, and content search results, and
 (viii) controlling when a particular content item is published by the published program component according to a set of predetermined publication criteria.

17. The method of claim 16, further comprising providing a hyperlink between a first set of content item information and a second set of content item information.

18. One or more processor readable storage devices having processor readable code embodied thereon, said processor readable code for programming one or more processors to perform a method of publishing formatted content including separately handling and formatting the content using a computer network including various sites connected by communication links, and various corresponding storage devices having computer-readable code embodied therein, the method comprising:
 (i) providing content definition parameters to a content definition editor that are based on one or more content item properties each having an assigned ID and types and each being generated in accordance with the property type and a property action;
 (ii) producing a content data structure in a database corresponding to the content definition parameters; and
 (iii) providing content item information to the content data structure, the content item information representing an instance of content that corresponds to the content definition parameters, and in connection with a same content item, the content definition parameters and the content item information are viewable on a display in one or more network browser windows; and
 (iv) generating and storing formatting information separately from the content item information;
 (v) consolidating multiple portions of content item information that are respectively stored in multiple databases; and
 (vi) publishing the content item information by combining the content item information and formatting information so as to present the content item information in a formatted manner; and
 (vii) managing created content items for routing them each to one or more of various sources based on at least one of enumeration properties of the content items, workflow metadata defining properties of the content items to be tracked, and content search results;
 (viii) controlling when a particular content item is published according to a set of predetermined publication criteria.

19. The one or more storage devices of claim 18, wherein the method further comprises providing a hyperlink between a first set of content item information and a second set of content item information.

20. A method of operating an integrated and modular content and format handling publishing system using a computer network including various sites connected by communication links, and various corresponding storage devices having computer-readable code embodied therein, the method comprising:
(a) handling content with a content handling program component, comprising:
 (i) providing content definition information that is based on one or more content item properties each having an assigned ID and property type and each being generated in accordance with the property type and a property action, and automatically producing a content data structure based on the content definition information,
 (ii) entering content item information to an input form that corresponds to the content definition information,
 (iii) submitting the content item information to a database, and in connection with a same content item, the content definition information and the content item information are viewable on a display in one or more network browser windows, and
 (iv) handling each said content item property;
(b) handling formatting with a format handling program component, comprising generating formatting information for the content item information and storing the formatting information separately from the content item information, and
(c) with a publisher program component, publishing the content item information to an electronic medium by combining the separately stored content item information and content format information; and
(d) a workflow system component for managing created content items for routing them each to one or more of various sources based on at least one of enumeration properties of the content items, workflow metadata defining properties of the content items to be tracked, and content search results,
(e) with a publication scheduler, controlling when a particular content item is published by the publisher according to a set of predetermined publication criteria.

21. A method as in claim 20, wherein the providing of content definition information comprises (i) accessing a naked web browser, (ii) selecting a predefined content definition, and wherein the publishing of content item information comprises (iii) combining the content item information with a predefined template so that the content item information is published in a formatted manner.

22. One or more processor readable storage devices having processor readable code embodied thereon, said processor readable code for programming one or more processors to perform a method of operating an integrated and modular content and format handling and publishing system, the method comprising:
(a) handling content with a content handling program component, comprising:
 (i) providing to a tabular form content definition information that are based on a list of one or more content item properties having assigned IDs and types and that are generated for each property in accordance with a property type and a property action, and automatically producing a content data structure based on the content definition information, (ii) entering content item information to an input form that corresponds to the content definition information,
(iii) submitting the content item information to a database, and in connection with a same content item, the content definition information and the content item information are viewable on a display in more than one separate network browser windows, and
(iv) handling each said content item property; and
(b) with a format handling program component, generating content format information for the content item information and storing the content format information, and
(c) with a publisher program component, publishing the content item information to an electronic medium by combining the content item information with the content format information; and
(d) with a workflow system component, managing created content items for routing them each to one or more of various sources based on at least one of enumeration properties of the content items, workflow metadata defining properties of the content items to be tracked, and content search results,
(e) with a publication scheduler, controlling when a particular content item is published by the publisher according to a set of predetermined publication criteria.

23. The one or more storage devices of claim 22, wherein the providing of content definition information comprises (i) accessing a naked web browser, (ii) selecting a predefined content definition, and wherein the publishing of content item information comprises (iii) combining the content item information with a predefined template so that the content item information is published in a formatted manner.

24. The one or more storage devices of claim 22, wherein the workflow system component itself is managed by one or more of enumeration properties, workflow data or content searches in a manner depending on at least one of said content definition, said content item information, and a choice made by a content creator, or by rules.

25. The one or more storage devices of claim 22, wherein the formatting information comprises extensible mark-up language (XML) fragments.

* * * * *

UNITED STATES PATENT AND TRADEMARK OFFICE
CERTIFICATE OF CORRECTION

PATENT NO.       : 7,962,844 B2                                    Page 1 of 1
APPLICATION NO.  : 11/852872
DATED            : June 14, 2011
INVENTOR(S)      : Knotz et al.

It is certified that error appears in the above-identified patent and that said Letters Patent is hereby corrected as shown below:

In column 2, line 16, delete "Web" and insert -- web --, therefor.

In column 2, line 47, before "DESCRIPTION" insert -- BRIEF --.

In column 5, line 49, delete "site 1" and insert -- site 11 --, therefor.

In column 7, line 6, delete "Extensible" and insert -- eXtensible --, therefor.

In column 7, line 55, delete "Web" and insert -- web --, therefor.

In column 7, line 66, delete "10" and insert -- 110 --, therefor.

In column 15, line 4, delete "decision-making" and insert -- decision making --, therefor.

In column 22, line 24, in Claim 8, delete "internet" and insert -- Internet --, therefor.

Signed and Sealed this
Twenty-fifth Day of October, 2011

David J. Kappos
*Director of the United States Patent and Trademark Office*